US012645583B2

(12) United States Patent
He et al.

(10) Patent No.: US 12,645,583 B2
(45) Date of Patent: Jun. 2, 2026

(54) SIGNAL MONITORING BY A MEMORY SYSTEM

(71) Applicant: Micron Technology, Inc., Boise, ID (US)

(72) Inventors: Deping He, Boise, ID (US); Huachen Li, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 18/546,738

(22) PCT Filed: Feb. 15, 2023

(86) PCT No.: PCT/CN2023/076129
§ 371 (c)(1),
(2) Date: Aug. 16, 2023

(87) PCT Pub. No.: WO2024/168574
PCT Pub. Date: Aug. 22, 2024

(65) Prior Publication Data
US 2025/0004939 A1     Jan. 2, 2025

(51) Int. Cl.
*G06F 12/02* (2006.01)
(52) U.S. Cl.
CPC ................................ *G06F 12/0246* (2013.01)
(58) Field of Classification Search
CPC .................................................. G06F 12/0246
USPC ........................................................ 711/103
See application file for complete search history.

(56) References Cited

U.S. PATENT DOCUMENTS

| | | | |
|---|---|---|---|
| 11,569,977 B1 | 1/2023 | Matsunaga | |
| 2014/0195852 A1* | 7/2014 | Gollub | G11C 29/10 714/33 |
| 2016/0342347 A1 | 11/2016 | Duzly et al. | |
| 2017/0102754 A1* | 4/2017 | Chi | G06F 1/10 |
| 2019/0180831 A1* | 6/2019 | Shukla | G11C 16/26 |
| 2020/0066316 A1 | 2/2020 | Cheng et al. | |
| 2020/0256913 A1* | 8/2020 | Sung | G06F 3/0679 |
| 2021/0193252 A1* | 6/2021 | Balb | G06F 3/0659 |
| 2022/0414032 A1 | 12/2022 | Jin et al. | |

FOREIGN PATENT DOCUMENTS

WO        2019212668 A1    11/2019

OTHER PUBLICATIONS

ISA/CN, "International Search Report and Written Opinion of the International Searching Authority," issued in connection with Int'l Appl. No. PCT/CN2023/076129, dated Jun. 23, 2023 (7 pages).

* cited by examiner

*Primary Examiner* — Gautam Sain
(74) *Attorney, Agent, or Firm* — Holland & Hart LLP

(57) ABSTRACT

Methods, systems, and devices for signal monitoring by a memory system are described. A memory system may receive signaling (e.g., from a host system) and may sample the signal and generate an eye diagram. During a normal mode of operation, the memory system monitor characteristics of the eye diagram to improve signaling. The memory system may determine a voltage level of the signaling based on one or more input parameters and sampling times associated with the signaling. An indication of the voltage level of the signaling may be stored (e.g., to a register of the memory system) and may be periodically transmitted to the host system.

15 Claims, 5 Drawing Sheets

200

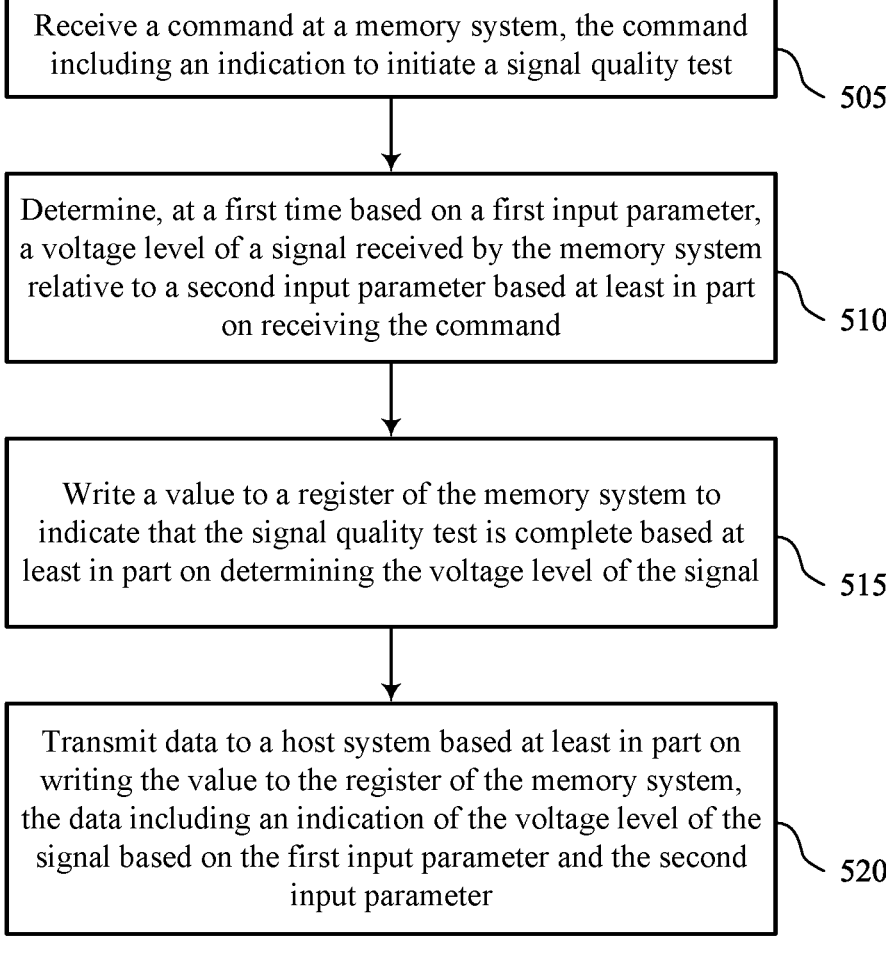

Receive a command at a memory system, the command including an indication to initiate a signal quality test — 505

Determine, at a first time based on a first input parameter, a voltage level of a signal received by the memory system relative to a second input parameter based at least in part on receiving the command — 510

Write a value to a register of the memory system to indicate that the signal quality test is complete based at least in part on determining the voltage level of the signal — 515

Transmit data to a host system based at least in part on writing the value to the register of the memory system, the data including an indication of the voltage level of the signal based on the first input parameter and the second input parameter — 520

SIGNAL MONITORING BY A MEMORY SYSTEM

CROSS REFERENCE

The present Application for Patent is a 371 national phase filing of International Patent Application No. PCT/CN2023/076129 by H E et al., entitled "SIGNAL MONITORING BY A MEMORY SYSTEM," filed Feb. 15, 2023, assigned to the assignee hereof, and expressly incorporated by reference herein.

TECHNICAL FIELD

The following relates to one or more systems for memory, including signal monitoring by a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 5 illustrates a flowchart showing a method or methods that support signal monitoring by a memory system in accordance with examples as disclosed herein.

DETAILED DESCRIPTION

Figure 1:
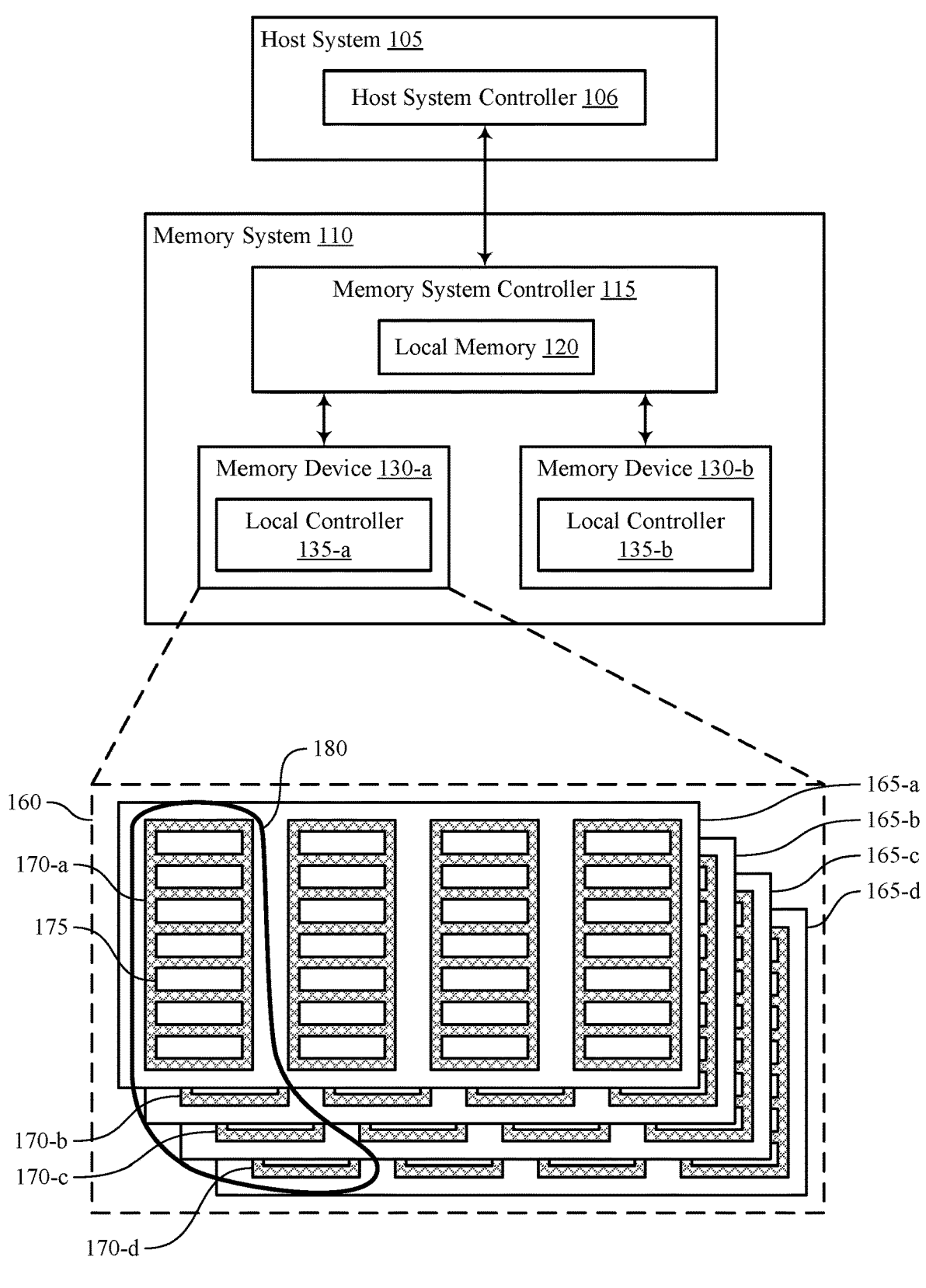
FIG. 1 illustrates an example of a system that supports signal monitoring by a memory system in accordance with examples as disclosed herein.

Some memory systems (e.g., non-volatile memory systems such as NAND memory systems) may receive signaling from a host system. For example, a memory system may receive signaling over one or more channels. An oscilloscope or other component of the memory system may sample the signal and may generate an eye diagram to provide an indication of the health of the signal integrity. The eye diagram may represent or illustrate four symbols of a signal (e.g., '00', '01', '10', or '11'), and each symbol may be represented by a different voltage amplitude.

In some instances, it may be advantageous to monitor aspects of the eye diagram by performing a signal quality test. Some memory systems may perform signal quality tests on signaling received from a host system during a diagnostic mode. However, performing a signal quality test while running in a diagnostic mode may introduce additional signaling overhead or unwanted latency for the memory system. Thus, a memory system configured to perform a signal quality test during a normal mode of operation (e.g., a non-diagnostic mode of operation) may be desirable.

A memory system configured to perform a signal quality test during a normal mode of operation is described herein. In some examples, a memory system may receive signaling (e.g., from a host system) and may sample the signal and generate an eye diagram. During a normal mode of operation, the memory system may receive signaling (e.g., a command) from the host system that initiates a signal quality test. To perform the signal quality test, the memory system may select one or more input parameters to determine a voltage level of the received signal. For example, the memory system may select a first input parameter (e.g., a timing parameter (Tstep)), a second timing parameter (e.g., a reference voltage parameter (Vstep)), or both. The memory system may then determine a voltage value of the received signal according to the selected input parameter(s) and may store an indication of the voltage value to a register (e.g., a register of the memory system).

In some instances, the memory system may enter a hibernate mode (e.g., a reduced power mode, a sleep mode) after determining the voltage value of the received signal according to the selected input parameter(s). While in the hibernate mode, the memory system may increment one or more of the selected input parameters for a subsequent instance of the signal quality test. For example, the memory system may increment Tstep, Vstep, or both. When the memory system enters (e.g., re-enters) a normal mode of operation, the memory system may determine (e.g., determine for a second time) the voltage value of the received signal according to the incremented input parameter(s). The memory system may continue incrementing the input parameter(s) until the eye diagram has been sampled and the resulting data (e.g., the result of the signal quality test) may be transmitted to the host system. By performing a signal quality test as described herein, the signaling overhead and latency of the memory system may be reduced and its overall performance may be improved.

Features of the disclosure are initially described in the context of systems, devices, and circuits with reference to FIG. 1. Features of the disclosure are described in the context of an eye diagram and process flow with reference to FIGS. 2 and 3. These and other features of the disclosure are further illustrated by and described in the context of an apparatus diagram and flowchart that relate to signal monitoring by a memory system with reference to FIGS. 4 and 5.

FIG. 1 illustrates an example of a system 100 that supports signal monitoring by a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support signal monitoring by a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 may receive signaling (e.g., from the host system 105) and may sample the signal and generate an eye diagram. During a normal mode of operation, the memory system 110 may receive signaling (e.g., a command) from the host system 105 that initiates a signal quality test. To perform the signal quality test, the memory system controller 115 may select one or more input parameters to determine a voltage level of the received signal. For example, the memory system controller 115 may select a first input parameter (e.g., Tstep), a second timing parameter (e.g., Vstep), or both. The memory system controller 115 may then determine a voltage value of the received signal according to the selected input parameter(s) and may store an indication of the voltage value to a register or to the local memory 120.

In some instances, the memory system 110 may enter a hibernate mode (e.g., a reduced power mode, a sleep mode) after determining the voltage value of the received signal according to the selected input parameter(s). While in the hibernate mode, the memory system controller 115 may increment one or more of the selected input parameters. For example, the memory system controller 115 may increment Tstep, Vstep, or both. When the memory system 110 enters (e.g., re-enters) a normal mode of operation, the memory system controller 115 may determine (e.g., determine for a second time) the voltage value of the received signal according to the incremented input parameter(s). The memory system controller 115 may continue incrementing the input parameter(s) until the eye diagram has been sampled and the resulting data (e.g., the result of the signal quality test) may be transmitted to the host system 105. By performing a signal quality test as described herein, the signaling overhead and latency of the memory system 110 may be reduced and its overall performance may be improved.

Figure 2:
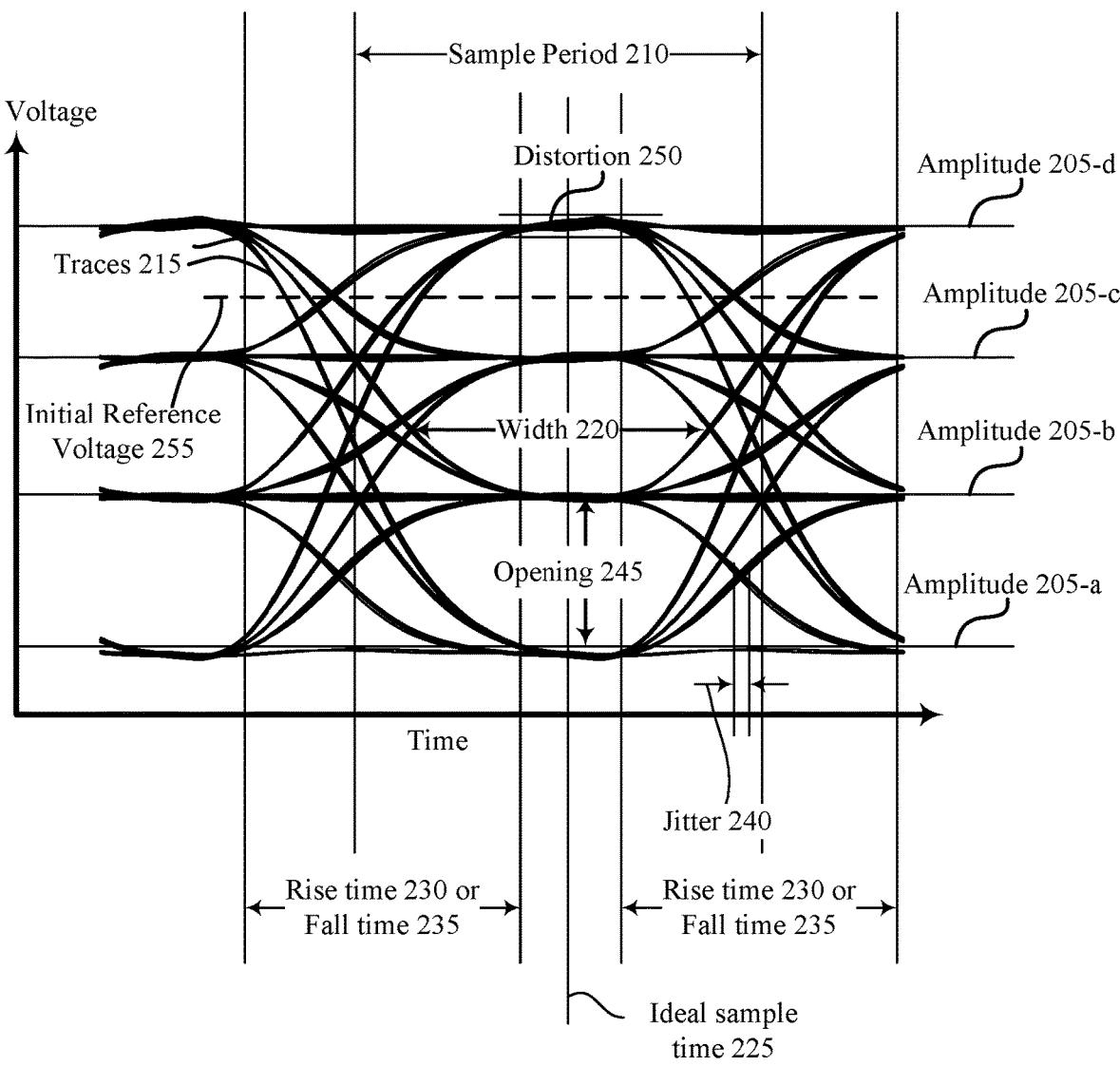
FIG. 2 illustrates an example of an eye diagram that supports signal monitoring by a memory system in accordance with examples as disclosed herein.

FIG. 2 illustrates an example of an eye diagram 200 that supports signal monitoring by a memory system in accordance with examples as disclosed herein. The eye diagram 200 may be used to indicate the quality of signals in high-speed transmissions and may represent four symbols of a signal (e.g., '00', '01', '10', or '11'). In some examples, each of the four symbols may be represented by a different voltage amplitude (e.g., amplitudes 205-*a*, 205-*b*, 205-*c*, 205-*d*). In other examples, the eye diagram 200 may represent a PAM4 signal that may be used to communicate data in a memory system (e.g., a memory system 110 as described with reference to FIG. 1). The eye diagram 200 may be used to provide a visual indication of the health of the signal integrity, and may indicate noise margins of the data signal. The noise margin may, for example, refer to an amount by which the signal exceeds the ideal boundaries of the amplitudes 205. In some examples, a memory system may perform a signal quality test during the sample period 210, which may reduce signaling overhead and latency of the memory system while improving its overall performance.

To generate the eye diagram 200, an oscilloscope or other computing device may sample a digital signal according to a sample period 210 (e.g., a unit interval or a bit period). The sample period 210 may be defined by a clock associated with the transmission of the measured signal. In some examples, the oscilloscope or other computing device may measure the voltage level of the signal during the sample period 210 to form a trace 215. Noise and other factors can result in the traces 215 measured from the signal deviating from a set of ideal step functions. By overlaying a plurality of traces 215, various characteristics about the measured signal may be determined. For example, the eye diagram 200 may be used to identify a number of characteristics of a communication signals such as jitter, cross talk, electromagnetic interference (EMI), signal loss, signal-to-noise ratio (SNR), other characteristics, or combinations thereof. A closed eye may indicate a noisy and/or unpredictable signal or other problems.

In some examples, the eye diagram 200 may indicate a width 220. The width 220 of an eye in the eye diagram 200 may be used to indicate a timing synchronization of the measured signal or jitter effects of the measured signal. In some examples, comparing the width 220 to the sample period 210 may provide a measurement of SNR of the measured signal. Each eye in an eye diagram may have a unique width based on the characteristics of the measured signal. Various encoding and decoding techniques may be used to modify the width 220 of the measured signal.

In other examples, the eye diagram 200 may indicate a sampling time 225 (e.g., an ideal sampling time) for determining the value of a logic state represented by a symbol of the measured signal. For example, determining a correct time for sampling data (e.g., timing synchronization) of the measured signal may be important to minimize the error rate in detection of the signal. For example, if a computing device samples a signal during a transition time (e.g., a rise time 230 or a fall time 235), errors may be introduced by the decoder into the data represented by a symbol of the signal. Various encoding and decoding techniques may be used to modify the ideal sampling time 225 of the measured signal.

The eye diagram 200 may be used to identify a rise time 230 and/or a fall time 235 for transitions from a first amplitude 205 to a second amplitude 205. The slope of the trace 215 during the rise time 230 or fall time 235 may indicate the signal's sensitivity to timing error, among other aspects. For example, the steeper the slope of the trace 215 (e.g., the smaller the rise time 230 and/or the fall times 235), the more ideal the transitions between amplitudes 205 are. Various encoding and decoding techniques may be used to modify the rise time 230 and/or fall time 235 of the measured signal.

In some examples, the eye diagram 200 may be used to identify an amount of jitter 240 in the measured signal. Jitter 240 may refer to a timing error that results from a misalignment of rise and fall times. Jitter 240 occurs when a rising edge or falling edge occurs at a time that is different from an ideal time defined by the data clock. Jitter 240 may be caused by signal reflections, intersymbol interference, cross-talk, process-voltage-temperature (PVT) variations, random jitter, additive noise, or combinations thereof. Various encoding and decoding techniques may be used to modify the jitter 240 of the measured signal. In some cases, the jitter 240 for each signal level or each eye may be different.

In other examples, the eye diagram 200 may indicate an eye opening 245, which may represent a peak-to-peak voltage difference between the various amplitudes 205. The eye opening 245 may be related to a voltage margin for discriminating between different amplitudes 205 of the measured signal. The smaller the margin, the more difficult it may be to discriminate between neighboring amplitudes, and the more errors that may be introduced due to noise. In some cases, a receiver of the signal may compare the signal to one or more threshold voltages positioned between the various amplitudes 205. In other cases, the larger the eye opening 245, the less likely it is that noise will cause the one or more voltage thresholds to be satisfied in error. The eye opening 245 may be used to indicate an amount of additive noise in the measured signal, and may be used to determine a SNR of the measured signal. Various encoding and decoding techniques may be used to modify the eye opening 245 of the measured signal. In some cases, the eye opening 245 for each eye may be different. In such cases, the eyes of the multi-level signal may not be identical.

In other examples, the eye diagram 200 may indicate distortion 250. The distortion 250 may represent overshoot and/or undershoot of the measured signal due to noise or interruptions in the signal path. As a signal settles into a new amplitude (e.g., amplitude 205-*b*) from an old amplitude (e.g., an amplitude 205-*c*), the signal may overshoot and/or undershoot the new amplitude level. In some examples, distortion 250 may be caused by this overshooting and/or undershooting, and may be caused by additive noise in the signal or interruptions in the signal path. Each eye in an eye diagram may have a unique opening based on the characteristics of the measured signal. Various encoding and decoding techniques may be used to modify the distortion 250 of the measured signal. In some cases, the distortion 250 for each signal level or each eye may be different.

The locations of the characteristics of the eye diagram 200 shown in FIG. 2 are for illustrative purposes only. Characteristics such as width 220, sampling time 225, rise time 230, fall time 235, jitter 240, eye opening 245, and/or distortion 250 may occur in other parts of the eye diagram 200 not specifically indicated in FIG. 2.

As discussed herein, a memory system (e.g., a memory system 110 as described with reference to FIG. 1) may receive signaling from a host system (e.g., a host system 105 as described with reference to FIG. 1). For example, while operating in a normal mode of operation, the memory system may receive a dedicated test set of data and may generate the eye diagram 200 using an oscilloscope or other component. In other instances, the memory system may receive a write command and may generate the eye diagram 200 based on the write command.

As used herein, a normal mode (e.g., an active mode) of operation may refer to a mode (or duration) when the memory system receives or processes commands, signaling, or both from a host system. Additionally, or alternatively, a hibernate mode may refer to a mode (or duration) when the memory system does not receive or process commands or signaling from the host system. The memory system may enter a hibernate mode upon receiving a command (e.g., a dedicated command) from the host system or upon an absence of signaling for a predefined duration. For example, the hibernate command may be defined by a specification, such as the JEDEC Universal Flash Storage Host Controller Interface (UFSHCI) 3.0 standard, and may be an example of an auto-hibernate command. The auto-hibernate command may be issued by a host system (e.g., the host system 105 as described with reference to FIG. 1) when an idle time is detected. That is, if the host system does not issue any commands for a duration or if the memory system does not process any commands for a duration, the host system may issue the auto-hibernate command. The memory system may remain in the hibernate mode for a duration (e.g., based on a value of a timer) or until one or more commands are received from the host system. For example, an idle timer maybe started in response to various conditions being satisfied (e.g., commands not received or processed). The idle timer may decrement until it reaches zero or until it is stopped as a result of the host system accessing the memory system in some way. If the idle timer reaches zero, the memory system may enter a hibernate state. After the memory system exits the hibernate state, the idle timer may be reset and re-enabled. The memory system may exit the hibernate state in response to a request to communicate information (e.g., over a UniPro link) and/or to process commands associated with the host system.

By way of example, if the host system detects an idle duration of 2 ms or greater, it may issue the auto-hibernate command and the memory system (e.g., the memory system controller 115 as described with reference to FIG. 1) may perform aspects of a signal quality test as described herein. The auto-hibernate operation (e.g., command) may allow the host system to put a UniPro link into a hibernate state autonomously. In some cases, a first register associated with the memory system may store an indication about whether the memory system supports the auto-hibernate operation. In some cases, a second register associated with the memory system may be used for the host system to enable or disable (or otherwise control) the auto-hibernate operation.

In some instances, it may be desirable for the memory system to perform a signal quality test on the signaling received from the host system. For example, a signal quality test may be performed to determine characteristics of the signal, such as width 220, sampling time 225, rise time 230, fall time 235, jitter 240, eye opening 245, and/or distortion 250. To initiate a signal quality test, the memory system (e.g., the memory system controller 115 as described with reference to FIG. 1) may receive a command from the host system. In some instances, the command may include an indication to initiate a signal quality test. The command may be a vendor-specific command and may be defined by a standard or specification (e.g., an MPHY specification).

When the command is received, the memory system controller may select one or more input parameters for performing the signal quality test. For example, the memory system controller may select an initial value of Tstep, Vstep, or both as input parameters for the signal quality test. An initial value of Tstep may correspond to a time (e.g., an instance) within the sample period 210 at which the signal is sampled to determine the voltage level. In some instances, the initial value of Tstep may correspond to the ideal sample time 225 (e.g., the midpoint or center of the eye). Over time, the ideal time for sampling may change as characteristics of the eye change (e.g., because the device ages or conditions, such as temperature, change). As part of the signal quality test, different times for sampling within the sample period 210 may be tried to determine the quality of the signals. Additionally, or alternatively, an initial value of Vstep may correspond to an initial reference voltage 255 within the opening 245. In some instances, the initial value of Vstep may correspond to the midpoint or the center of the opening 245. Over time, the ideal reference voltage for distinguishing between two states may change as characteristics of the eye change (e.g., because the device ages or conditions, such as temperature, change). As part of the signal quality test, different reference voltages for comparing measured signals against may be tried to determine the quality of the signals. In some examples, the term Tstep and Vstep may refer to the incremental differences of the next test iteration relative to the values of the current test iteration.

The memory system controller may also select a quantity of iterations (e.g., loops) for performing the signal quality test. For example, after determining a voltage value of the received signal based on Tstep and Vstep, the memory system controller may increment Tstep, Vstep, or both and determine (e.g., determine for a second instance) the voltage value of the received signal. Each instance that the memory system controller determines the voltage value of the received signal (e.g., after incrementing Tstep, Vstep, or both) may correspond to an iteration (e.g., a loop). The memory system controller may select the quantity of iterations such that enough data points are collected to accurately analyze the quality of the signal. For example, the memory system controller may select 100 or 1,000 iterations for performing the signal quality test.

In some examples, the memory system controller may determine a voltage value of the signal based on Tstep and Vstep (e.g., based on the ideal sample time 225 and the initial reference voltage 255). As described herein, the initial value of Tstep and Vstep may correspond to the midpoints of the width 220 and the opening 245, respectively, of an ideal eye (e.g., an eye with characteristics corresponding to a known symbol). Accordingly, the memory system controller may determine a voltage value (e.g., a first voltage value) of the symbol at a first time (e.g., at Tstep, at the ideal sample time 225) relative to the initial reference voltage 255 (e.g., relative to Vstep). The memory system controller may store (e.g., save) an indication of the voltage value to a component of the memory system. For example, the memory system controller may store the indication, as a data point, to a log or a register of the memory system.

After determining the first voltage value of the signal, the memory system may enter a hibernate mode. In some instances, the memory system may be forced into a hibernate mode based on a command received from the host system. In other instances, the memory system may enter a hibernate mode based on an absence of signaling received from the host system (e.g., without receiving a dedicated command). In either instance, when operating in the hibernate mode, the memory system controller may increment Tstep, Vstep, or both.

To increment Tstep, the memory system controller may select a second time within the sample period 210. The second time may be prior or subsequent to the first time. That is, Tstep may be incremented (or decremented) in either direction relative to the ideal sample time 225. Additionally, or alternatively, to increment Vstep, the memory system controller may select a second reference voltage within the opening 245. The second reference voltage may be greater than or less than the first reference voltage. That is, Vstep may be incremented (or decremented) in either direction relative to the initial reference voltage 255. In some instances, Tstep may be incremented a different quantity of times than Vstep during the signal quality test. For example, the memory system controller may increment Tstep a first quantity of times (e.g., 40 times) during the signal quality test, and may increment Vstep a second quantity of times (14 times). Thus, in some instances, both Tstep and Vstep may be incremented while in other instances only one of Tstep or Vstep may be incremented when operating in the hibernate mode.

After incrementing Tstep, Vstep, or both the memory system may exit the hibernate mode. In some instances, the memory system may exit the hibernate mode (and enter a normal or active mode of operation) based on receiving a command received from the host system. In other instances, the memory system may exit the hibernate mode based on signaling received from the host system. For example, the memory system may receive a read command, a write command, or another type of command, which may result in the memory system exiting the hibernate mode and entering (e.g., re-entering) the active or normal mode of operation.

When operating in the normal or active mode of operation, the memory system controller may determine the voltage value (e.g., the second voltage value) of the signal using the incremented Tstep or Vstep (or both). The memory system controller may store (e.g., save) an indication of the second voltage value to a component of the memory system. For example, the memory system controller may store the indication, as a data point, to a log or a register of the memory system. The memory system may continue incrementing Tstep, Vstep, or both until the selected quantity of iterations (e.g., loops) is satisfied.

Once the selected quantity of iterations is satisfied, the memory system controller may write a value to a register that indicates the signal quality test is complete. For example, the memory system controller may update a value stored to a register (e.g., from a 0 to a 1), which may indicate that the signal quality test is complete. In some instances, the host system may periodically poll the register to determine whether the signal quality test is complete. That is, after initiating the signal quality test, the host system may poll the register at a predefined interval. When the host system determines that the signal quality test is complete (e.g., based on the value of the register), the host system may transmit a command (e.g., a request) for the results of the signal quality test. The memory system may transmit the results of the signal quality test in response to the command and may delete the results after successfully transmitting the results to the host system. By performing a signal quality test as described herein, the signaling overhead and latency of the memory system may be reduced and its overall performance may be improved.

Figure 3:
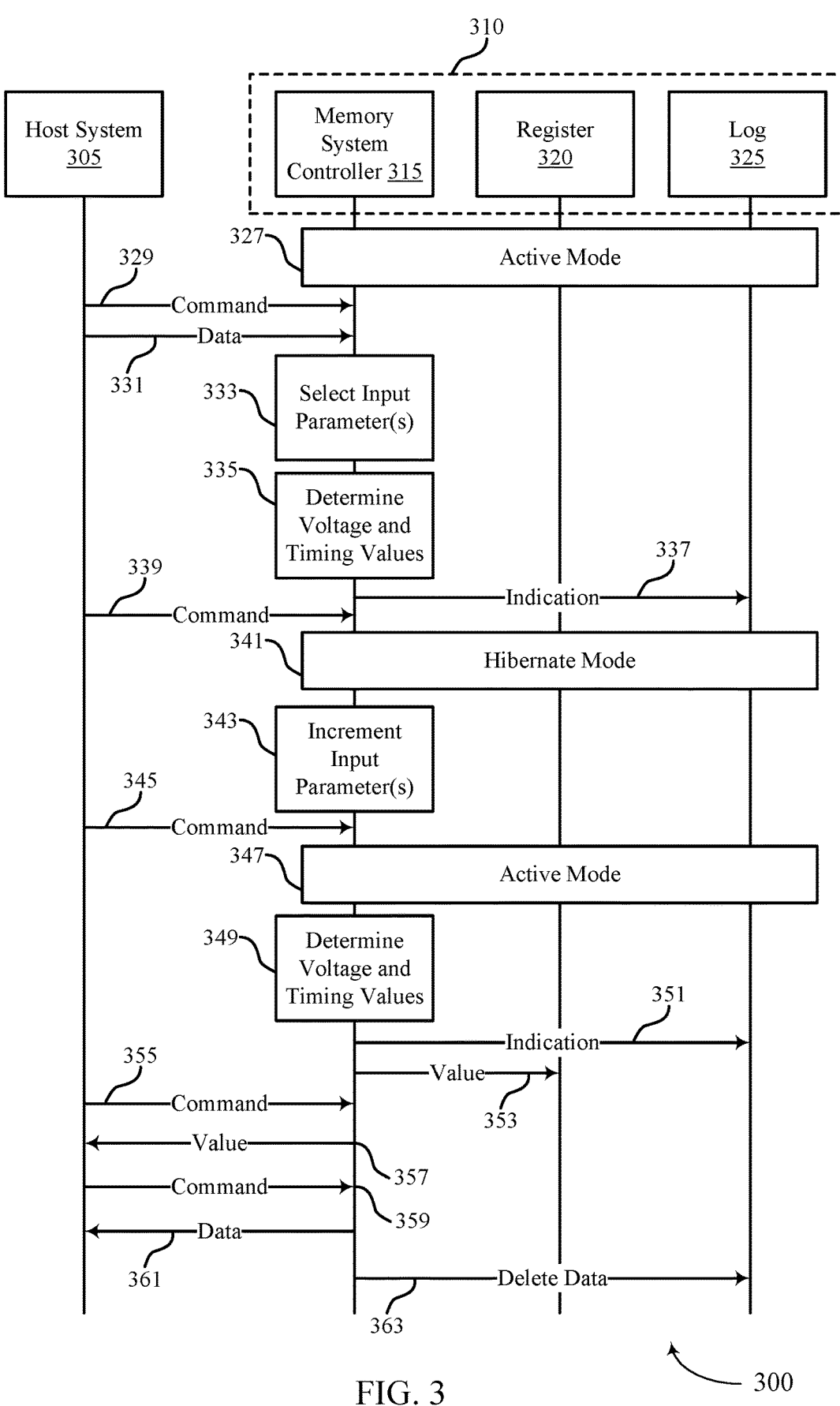
FIG. 3 illustrates an example of a process flow that supports signal monitoring by a memory system in accordance with examples as disclosed herein.

FIG. 3 illustrates an example of a process flow 300 that supports signal monitoring by a memory system in accordance with examples as disclosed herein. The process flow 300 may include one or more aspects of the system 100. For example, the process flow 300 may include a host system 305, a memory system 310, a memory system controller 315, a register 320, and a log 325, which may be examples of one or more corresponding devices described herein, including with reference to FIG. 1. The process flow 300 may support performing a signal quality test on data received from the host system 305, which may reduce signaling overhead and latency of the memory system 310 while improving its overall performance.

The process flow 300 may illustrate an example of the memory system controller 315 performing a signal quality test on data received from the host system 305. Alternative examples of the following may be implemented, where some processes are performed in a different order than described or are not performed. In some cases, processes may include additional features not mentioned below, or further processes may be added.

Aspects of the process flow 300 may be implemented by a memory system controller 315, among other components. Additionally, or alternatively, aspects of the process flow 300 may be implemented as instructions stored in memory (e.g., firmware stored in a memory coupled with a host system or a memory system). For example, the instructions, when executed by a controller (e.g., the memory system controller 315), may cause the controller to perform the operations of the process flow 300.

At 327, the memory system 310 may be operating in an active mode (e.g., a normal mode). As described herein, the memory system 310 may receive and process commands from the host system 305 while operating in the active mode. Although not illustrated in FIG. 3, the memory system 310 may operate in the active mode until it transitions to a hibernate mode (e.g., at 341).

At 329, a command may be received by the memory system 310. In some instances, the command may be received by the memory system controller 315 from the host system 305 and may include an indication to initiate a signal quality test. The command may be a vendor-specific command and may be defined by a standard or specification (e.g., an MPHY specification).

At 331, data may be received by the memory system 310. In some examples, the data may be received by the memory system controller 315 from the host system 305. The data may be test data or a write command. For example, the host system 305 may transmit test data to the memory system 310 for the purpose of performing a signal quality test on. In other examples, the host system 305 may transmit a write command and the memory system controller 315 may perform a signal quality test on the data associated with the write command.

At 333, the initial input parameters may be selected by the memory system. In some examples, the memory system controller 315 may select an initial first input parameter (e.g., Tstep) and an initial second input parameter (e.g., Vstep). In some instances, the memory system controller 315 may also select a quantity of iterations (e.g., loops) for performing the signal quality test.

At 335, a voltage value of the signal may be determined. The memory system controller 315 may determine the voltage value based on a signal associated with the data received from the host system 305 (e.g., at 331). In some examples, the voltage value of the signal may be determined at a first time (e.g., according to the initial Tstep value) and may be determined based on the initial Vstep value.

Additionally, or alternatively, at 335 the memory system controller 315 may determine a timing window of the signal according to the initial input parameters. A timing window may refer to a voltage value of the signal at a given time. For example, a voltage value that is within a threshold range of a target voltage value at a given time may represent a signal (or a portion of a signal) having a relatively high signal quality. In other instances, a voltage value that is outside of a threshold range of a target voltage value at a given time may represent a signal (or a portion of a signal) having a relatively low signal quality.

At 337, an indication of the voltage value may be written to the memory system 310. In some examples, the memory system controller 315 may write an indication of the voltage value to a log 325 of the memory system. The log 325 may store one or more indications of respective voltage values, which may be transmitted to the host system 305 upon completion of the signal quality test.

At 339, a command may be received by the memory system 310. In some instances, the command may be received by the memory system controller 315 from the host system 305 and may include an indication to transition from the active mode to a hibernate mode.

At 341, the memory system 310 may transition from the active mode to the hibernate mode. As described herein, a hibernate mode may refer to a low power mode, a reduced power mode, or any mode other than an active mode.

At 343, one or more of the input parameters may be incremented. In some examples, the memory system controller 315 may increment Tstep, Vstep, or both. For example, Tstep may be incremented and Vstep may be held constant, Tstep may be held constant and Vstep may be incremented, or both Tstep and Vstep may be incremented.

At 345, a command may be received by the memory system 310. In some instances, the command may be received by the memory system controller 315 from the host system 305 and may include an indication to transition from the hibernate mode to the active mode.

At 347, the memory system 310 may transition from the hibernate mode to the active mode. As described herein, an active mode may refer to a mode where the memory system 310 receives and processes commands received from the host system 305.

At 349, a voltage value of the signal may be determined for a second time. The memory system controller 315 may determine the voltage value at the second time using the updated (e.g., incremented) input parameters. In some examples, the voltage value of the signal may be determined at a second time (e.g., according to the incremented Tstep value) and may be determined based on the incremented Vstep value.

Additionally, or alternatively, at 349 the memory system controller 315 may determine a timing window of the signal according to the updated (e.g., incremented) input parameters. A timing window may refer to a voltage value of the signal at a given time. For example, a voltage value that is within a threshold range of a target voltage value at a given time may represent a signal (or a portion of a signal) having a relatively high signal quality. In other instances, a voltage value that is outside of a threshold range of a target voltage value at a given time may represent a signal (or a portion of a signal) having a relatively low signal quality.

At 351, an indication of the second voltage value may be written to the memory system 310. In some examples, the memory system controller 315 may write an indication of the second voltage value to a log 325 of the memory system.

Figure 4:
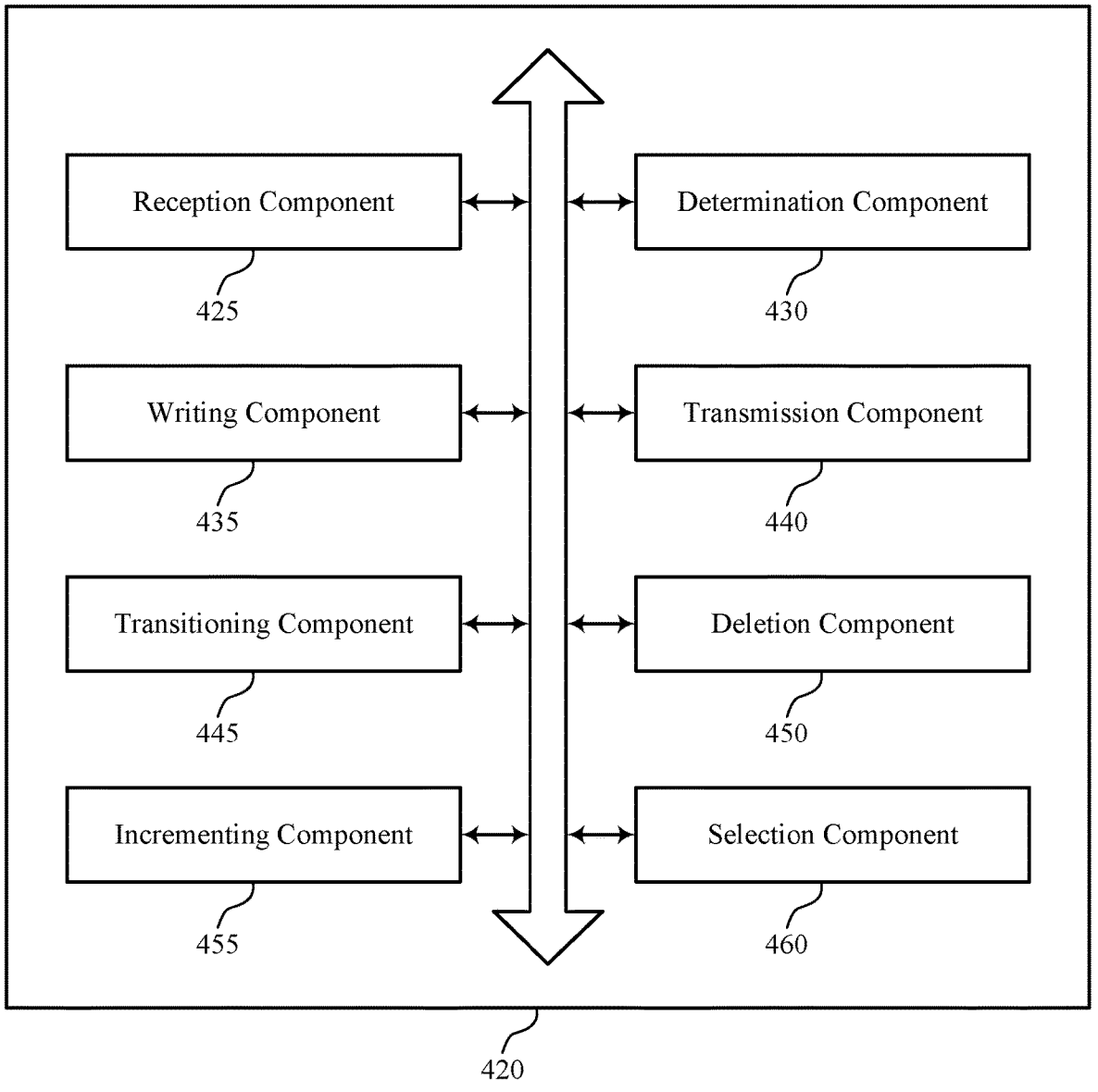
FIG. 4 illustrates a block diagram of a memory system that supports signal monitoring by a memory system in accordance with examples as disclosed herein.

In some instances, although not illustrated in FIG. 4, the operations between 339 and 351 may be performed any quantity of times. For example, the operations performed between 339 and 351 may constitute one iteration (e.g., one loop). The quantity of loops performed as part of the signal quality test may be based on the quantity of iterations selected by the memory system controller (e.g., at 333).

At 353, a value may be written to a register 320 of the memory system 310. In some instances, the memory system controller 315 may write (or update) a value to the register 320 that indicates the signal quality test is complete. For example, the memory system controller 315 may write a "1" (or update a "0" to be a "1") to indicate the completion of the signal quality test.

At 355, a command may be received by the memory system 310. In some instances, the command may be received by the memory system controller 315 from the host system 305 and may include a request to poll the register 320. Although not shown, the host system 305 may poll the register 320 at one or more intervals prior to 355.

At 357, the value of the register may be transmitted to the host system 305. In some instances, the value may be transmitted by the memory system controller 315 and may indicate that the signal quality test is complete.

At 359, a command may be received by the memory system 310. In some instances, the command may be received by the memory system controller 315 from the host system 305 and may include a request for the data stored to the log 325. The command may be transmitted by the host system 305 based on a value received (e.g., at 357).

At 361, the data stored to the log 325 may be transmitted to the host system 305. In some instances, the data may be transmitted by the memory system controller 315.

At 363, the data stored to the log 325 may be deleted. In some instances, the data may be deleted by the memory system controller 315. By performing a signal quality test as described herein, the signaling overhead and latency of the memory system 310 may be reduced and its overall performance may be improved.

FIG. 4 illustrates a block diagram 400 of a memory system 420 that supports signal monitoring by a memory system in accordance with examples as disclosed herein. The memory system 420 may be an example of aspects of a memory system as described with reference to FIGS. 1 through 3. The memory system 420, or various components thereof, may be an example of means for performing various aspects of signal monitoring by a memory system as described herein. For example, the memory system 420 may include a reception component 425, a determination component 430, a writing component 435, a transmission component 440, a transitioning component 445, a deletion component 450, an incrementing component 455, a selection component 460, or any combination thereof. Each of these components may communicate, directly or indirectly, with one another (e.g., via one or more buses).

The reception component 425 may be configured as or otherwise support a means for receiving a command at a memory system, the command including an indication to initiate a signal quality test. The determination component 430 may be configured as or otherwise support a means for determining, at a first time based on a first input parameter, a voltage level of a signal received by the memory system relative to a second input parameter based at least in part on receiving the command. The writing component 435 may be configured as or otherwise support a means for writing a value to a register of the memory system to indicate that the signal quality test is complete based at least in part on determining the voltage level of the signal. The transmission component 440 may be configured as or otherwise support a means for transmitting data to a host system based at least in part on writing the value to the register of the memory system, the data including an indication of the voltage level of the signal based on the first input parameter and the second input parameter.

In some examples, the transitioning component 445 may be configured as or otherwise support a means for transitioning, by the memory system, from an active mode to a hibernate mode based at least in part on determining the voltage level of the signal.

In some examples, the incrementing component 455 may be configured as or otherwise support a means for incrementing, in response to operating in the hibernate mode, the first input parameter. In some examples, the transitioning component 445 may be configured as or otherwise support a means for transitioning from the hibernate mode to the active mode based at least in part on incrementing the first input parameter. In some examples, the determination component 430 may be configured as or otherwise support a means for determining, at a second time based on the incremented first input parameter, the voltage level of the signal received by the memory system relative to the second input parameter, where the data transmitted to the host system includes an indication of the voltage level of the signal based on the incremented first input parameter.

In some examples, the incrementing component 455 may be configured as or otherwise support a means for incrementing, while operating in the hibernate mode, the second input parameter. In some examples, the transitioning component 445 may be configured as or otherwise support a means for transitioning from the hibernate mode to the active mode based at least in part on incrementing the second input parameter. In some examples, the determination component 430 may be configured as or otherwise support a means for determining, at the first time, the voltage level of the signal received by the memory system relative to the incremented second input parameter, where the data transmitted to the host system includes an indication of the voltage level of the signal based on the incremented second input parameter.

In some examples, the incrementing component 455 may be configured as or otherwise support a means for incrementing, while operating in the hibernate mode, the first input parameter and the second input parameter. In some examples, the transitioning component 445 may be configured as or otherwise support a means for transitioning from the hibernate mode to the active mode based at least in part on incrementing the first input parameter and the second input parameter. In some examples, the determination component 430 may be configured as or otherwise support a means for determining, at a third time based on the incremented first input parameter, the voltage level of the signal received by the memory system relative to the incremented second input parameter, where the data transmitted to the host system includes an indication of the voltage level of the signal based on the incremented first input parameter and the second input parameter.

In some examples, the reception component 425 may be configured as or otherwise support a means for receiving a second command at the memory system, the second command including an indication to transition from the hibernate mode to the active mode, where transmitting the data to the host system is based at least in part on receiving the second command.

In some examples, the writing component 435 may be configured as or otherwise support a means for writing the data to the memory system based at least in part on determining the voltage level of the signal, where transmitting the data to the host system is based at least in part on writing the data to the memory system. In some examples, the deletion component 450 may be configured as or otherwise support a means for deleting the data from the memory system based at least in part on transmitting the data to the host system.

In some examples, the reception component 425 may be configured as or otherwise support a means for receiving a third command to poll the value of the register based at least in part on writing the value to the register of the memory system. In some examples, the transmission component 440 may be configured as or otherwise support a means for transmitting an indication of the value of the register to the host system based at least in part on receiving the third command.

In some examples, the reception component 425 may be configured as or otherwise support a means for receiving a fourth command that requests the data associated with the signal quality test based at least in part on transmitting the indication of the value of the register to the host system, where the data is transmitted to the host system based at least in part on receiving the fourth command.

In some examples, the incrementing component 455 may be configured as or otherwise support a means for incrementing the first input parameter, the second input parameter, or both a plurality of instances. In some examples, the determination component 430 may be configured as or otherwise support a means for determining the voltage level of the signal, a timing window of the signal, or both after each incrementation of the first input parameter, the second input parameter, or both.

In some examples, the determination component 430 may be configured as or otherwise support a means for determining that the voltage level of the signal has been determined a threshold quantity of instances, where transmitting the data to the host system is based at least in part on determining that the voltage level of the signal has been determined the threshold quantity of instances.

In some examples, the reception component 425 may be configured as or otherwise support a means for receiving information on which to perform the signal quality test based at least in part on receiving the command, where the signal received by the memory system is associated with the information on which to perform the signal quality test.

In some examples, the reception component 425 may be configured as or otherwise support a means for receiving a write command based at least in part on receiving the command, where the signal quality test is performed on signals associated with the write command, where the signal received by the memory system is associated with the write command.

In some examples, the selection component 460 may be configured as or otherwise support a means for selecting, by the memory system, the first input parameter and the second input parameter based at least in part on receiving the command.

FIG. 5 illustrates a flowchart showing a method 500 that supports signal monitoring by a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a command at a memory system, the command including an indication to initiate a signal quality test. The operations of 505 may be performed in accordance with examples as disclosed herein. In some examples, aspects of the operations of 505 may be performed by a reception component 425 as described with reference to FIG. 4.

At 510, the method may include determining, at a first time based on a first input parameter, a voltage level of a signal received by the memory system relative to a second input parameter based at least in part on receiving the command. The operations of 510 may be performed in accordance with examples as disclosed herein. In some examples, aspects of the operations of 510 may be performed by a determination component 430 as described with reference to FIG. 4.

At 515, the method may include writing a value to a register of the memory system to indicate that the signal quality test is complete based at least in part on determining the voltage level of the signal. The operations of 515 may be performed in accordance with examples as disclosed herein. In some examples, aspects of the operations of 515 may be performed by a writing component 435 as described with reference to FIG. 4.

At 520, the method may include transmitting data to a host system based at least in part on writing the value to the register of the memory system, the data including an indication of the voltage level of the signal based on the first input parameter and the second input parameter. The operations of 520 may be performed in accordance with examples as disclosed herein. In some examples, aspects of the operations of 520 may be performed by a transmission component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command at a memory system, the command including an indication to initiate a signal quality test; determining, at a first time based on a first input parameter, a voltage level of a signal received by the memory system relative to a second input parameter based at least in part on receiving the command; writing a value to a register of the memory system to indicate that the signal quality test is complete based at least in part on determining the voltage level of the signal; and transmitting data to a host system based at least in part on writing the value to the register of the memory system, the data including an indication of the voltage level of the signal based on the first input parameter and the second input parameter.

Aspect 2: The method, apparatus, or non-transitory computer-readable medium of aspect 1, further including operations, features, circuitry, logic, means, or instructions, or any combination thereof for transitioning, by the memory system, from an active mode to a hibernate mode based at least in part on determining the voltage level of the signal.

Aspect 3: The method, apparatus, or non-transitory computer-readable medium of aspect 2, further including operations, features, circuitry, logic, means, or instructions, or any combination thereof for incrementing, in response to operating in the hibernate mode, the first input parameter; transitioning from the hibernate mode to the active mode based at least in part on incrementing the first input parameter; and determining, at a second time based on the incremented first input parameter, the voltage level of the signal received by the memory system relative to the second input parameter, where the data transmitted to the host system includes an indication of the voltage level of the signal based on the incremented first input parameter.

Aspect 4: The method, apparatus, or non-transitory computer-readable medium of any of aspects 2 through 3, further including operations, features, circuitry, logic, means, or instructions, or any combination thereof for incrementing, while operating in the hibernate mode, the second input parameter; transitioning from the hibernate mode to the active mode based at least in part on incrementing the second input parameter; and determining, at the first time, the voltage level of the signal received by the memory system relative to the incremented second input parameter, where the data transmitted to the host system includes an indication of the voltage level of the signal based on the incremented second input parameter.

Aspect 5: The method, apparatus, or non-transitory computer-readable medium of any of aspects 2 through 4, further including operations, features, circuitry, logic, means, or instructions, or any combination thereof for incrementing, while operating in the hibernate mode, the first input parameter and the second input parameter; transitioning from the hibernate mode to the active mode based at least in part on incrementing the first input parameter and the second input parameter; and determining, at a third time based on the incremented first input parameter, the voltage level of the signal received by the memory system relative to the incremented second input parameter, where the data transmitted to the host system includes an indication of the voltage level of the signal based on the incremented first input parameter and the second input parameter.

Aspect 6: The method, apparatus, or non-transitory computer-readable medium of any of aspects 2 through 5, further including operations, features, circuitry, logic, means, or instructions, or any combination thereof for receiving a second command at the memory system, the second command including an indication to transition from the hibernate mode to the active mode, where transmitting the data to the host system is based at least in part on receiving the second command.

Aspect 7: The method, apparatus, or non-transitory computer-readable medium of any of aspects 1 through 6, further including operations, features, circuitry, logic, means, or instructions, or any combination thereof for writing the data to the memory system based at least in part on determining the voltage level of the signal, where transmitting the data to the host system is based at least in part on writing the data to the memory system and deleting the data from the memory system based at least in part on transmitting the data to the host system.

Aspect 8: The method, apparatus, or non-transitory computer-readable medium of any of aspects 1 through 7, further including operations, features, circuitry, logic, means, or instructions, or any combination thereof for receiving a third command to poll the value of the register based at least in part on writing the value to the register of the memory system and transmitting an indication of the value of the register to the host system based at least in part on receiving the third command.

Aspect 9: The method, apparatus, or non-transitory computer-readable medium of aspect 8, further including operations, features, circuitry, logic, means, or instructions, or any combination thereof for receiving a fourth command that requests the data associated with the signal quality test based at least in part on transmitting the indication of the value of the register to the host system, where the data is transmitted to the host system based at least in part on receiving the fourth command.

Aspect 10: The method, apparatus, or non-transitory computer-readable medium of any of aspects 1 through 9, further including operations, features, circuitry, logic, means, or instructions, or any combination thereof for incrementing the first input parameter, the second input parameter, or both a plurality of instances and determining the voltage level of the signal, a timing window of the signal, or both after each incrementation of the first input parameter, the second input parameter, or both.

Aspect 11: The method, apparatus, or non-transitory computer-readable medium of aspect 10, further including operations, features, circuitry, logic, means, or instructions, or any combination thereof for determining that the voltage level of the signal has been determined a threshold quantity of instances, where transmitting the data to the host system is based at least in part on determining that the voltage level of the signal has been determined the threshold quantity of instances.

Aspect 12: The method, apparatus, or non-transitory computer-readable medium of any of aspects 1 through 11, further including operations, features, circuitry, logic, means, or instructions, or any combination thereof for receiving information on which to perform the signal quality test based at least in part on receiving the command, where the signal received by the memory system is associated with the information on which to perform the signal quality test.

Aspect 13: The method, apparatus, or non-transitory computer-readable medium of any of aspects 1 through 12, further including operations, features, circuitry, logic, means, or instructions, or any combination thereof for receiving a write command based at least in part on receiving the command, where the signal quality test is performed on signals associated with the write command, where the signal received by the memory system is associated with the write command.

Aspect 14: The method, apparatus, or non-transitory computer-readable medium of any of aspects 1 through 13, further including operations, features, circuitry, logic, means, or instructions, or any combination thereof for selecting, by the memory system, the first input parameter and the second input parameter based at least in part on receiving the command.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a controller associated with a memory device, wherein the controller is configured to cause the apparatus to:
receive a command, the command comprising an indication to initiate a signal quality test;
determine, at a first time while operating in an active mode of the apparatus and based on a first input parameter, a voltage level of a signal received by the controller relative to a second input parameter based at least in part on receiving the command, the second input parameter comprising a reference voltage level;
transition from the active mode to a hibernate mode of the apparatus based at least in part on determining the voltage level of the signal;
write, while operating in the hibernate mode of the apparatus, a value to a register of the memory device to indicate that the signal quality test is complete based at least in part on determining the voltage level of the signal;

increment, in response to operating in the hibernate mode, the first input parameter;

transition from the hibernate mode to the active mode based at least in part on incrementing the first input parameter;

determine, at a second time based on the incremented first input parameter, the voltage level of the signal received by the controller relative to the second input parameter; and transmit data to a host system based at least in part on writing the value to the register of the memory device, the data comprising an indication of the voltage level of the signal based on the incremented first input parameter and the second input parameter.

2. The apparatus of claim 1, wherein the controller is further configured to cause the apparatus to:

increment, while operating in the hibernate mode, the second input parameter;

transition from the hibernate mode to the active mode based at least in part on incrementing the second input parameter; and determine, at the first time, the voltage level of the signal received by the controller relative to the incremented second input parameter, wherein the data transmitted to the host system comprises the indication of the voltage level of the signal based on the incremented second input parameter.

3. The apparatus of claim 1, wherein the controller is further configured to cause the apparatus to:

increment, while operating in the hibernate mode, the first input parameter and the second input parameter;

transition from the hibernate mode to the active mode based at least in part on incrementing the first input parameter and the second input parameter; and determine, at a third time based on the incremented first input parameter, the voltage level of the signal received by the controller relative to the incremented second input parameter, wherein the data transmitted to the host system comprises the indication of the voltage level of the signal based on the incremented first input parameter and the second input parameter.

4. The apparatus of claim 1, wherein the controller is further configured to cause the apparatus to:

receive a second command, the second command comprising an indication to transition from the hibernate mode to the active mode, wherein transmitting the data to the host system is based at least in part on receiving the second command.

5. The apparatus of claim 1, wherein the controller is further configured to cause the apparatus to:

increment the first input parameter, the second input parameter, or both a plurality of instances; and determine the voltage level of the signal, a timing window of the signal, or both after each incrementation of the first input parameter, the second input parameter, or both.

6. The apparatus of claim 5, wherein the controller is further configured to cause the apparatus to:

determine that the voltage level of the signal has been determined a threshold quantity of instances, wherein transmitting the data to the host system is based at least in part on determining that the voltage level of the signal has been determined the threshold quantity of instances.

7. The apparatus of claim 1, wherein the controller is further configured to cause the apparatus to:

receive information on which to perform the signal quality test based at least in part on receiving the command, wherein the signal received by the controller is associated with the information on which to perform the signal quality test.

8. The apparatus of claim 1, wherein the controller is further configured to cause the apparatus to:

receive a write command based at least in part on receiving the command, wherein the signal quality test is performed on signals associated with the write command, wherein the signal received by the controller is associated with the write command.

9. An apparatus, comprising:

a controller associated with a memory device, wherein the controller is configured to cause the apparatus to:

receive a command, the command comprising an indication to initiate a signal quality test;

determine, at a first time while operating in an active mode of the apparatus and based on a first input parameter, a voltage level of a signal received by the controller relative to a second input parameter based at least in part on receiving the command, the second input parameter comprising a reference voltage level;

write data to the memory device based at least in part on determining the voltage level of the signal, the data comprising an indication of the voltage level of the signal based on the first input parameter and the second input parameter;

write, while operating in a hibernate mode of the apparatus, a value to a register of the memory device to indicate that the signal quality test is complete based at least in part on determining the voltage level of the signal;

transmit the data to a host system based at least in part on writing the value to the register of the memory device, wherein transmitting the data to the host system is based at least in part on writing the data to the memory device; and delete the data from the memory device based at least in part on transmitting the data to the host system.

10. An apparatus, comprising:

a controller associated with a memory device, wherein the controller is configured to cause the apparatus to:

receive a command, the command comprising an indication to initiate a signal quality test;

determine, at a first time while operating in an active mode of the apparatus and based on a first input parameter, a voltage level of a signal received by the controller relative to a second input parameter based at least in part on receiving the command, the second input parameter comprising a reference voltage level;

write, while operating in a hibernate mode of the apparatus, a value to a register of the memory device to indicate that the signal quality test is complete based at least in part on determining the voltage level of the signal;

receive a second command to poll the value of the register based at least in part on writing the value to the register of the memory device;

transmit an indication of the value of the register to a host system based at least in part on receiving the second command; and transmit data to the host system based at least in part on writing the value to the register of the memory device, the data comprising an indication of the voltage level of the signal based on the first input parameter and the second input parameter.

11. The apparatus of claim 10, wherein the controller is further configured to cause the apparatus to:

receive a third command that requests the data associated with the signal quality test based at least in part on transmitting the indication of the value of the register to the host system, wherein the data is transmitted to the host system based at least in part on receiving the third command.

12. An apparatus, comprising:

a controller associated with a memory device, wherein the controller is configured to cause the apparatus to:

receive a command, the command comprising an indication to initiate a signal quality test;

select a first input parameter and a second input parameter based at least in part on receiving the command;

determine, at a first time while operating in an active mode of the apparatus and based on the first input parameter, a voltage level of a signal received by the controller relative to the second input parameter based at least in part on receiving the command, the second input parameter comprising a reference voltage level;

write, while operating in a hibernate mode of the apparatus, a value to a register of the memory device to indicate that the signal quality test is complete based at least in part on determining the voltage level of the signal; and transmit data to a host system based at least in part on writing the value to the register of the memory device, the data comprising an indication of the voltage level of the signal based on the first input parameter and the second input parameter.

13. A non-transitory computer-readable medium storing code comprising instructions which, when executed by a processor of an electronic device, cause the electronic device to:

receive a command at a memory system, the command comprising an indication to initiate a signal quality test;

determine, at a first time while operating in an active mode of the memory system and based on a first input parameter, a voltage level of a signal received by the memory system relative to a second input parameter based at least in part on receiving the command, the second input parameter comprising a reference voltage level;

transition from the active mode to a hibernate mode of the memory system based at least in part on determining the voltage level of the signal;

write, while operating in the hibernate mode of the memory system, a value to a register of the memory system to indicate that the signal quality test is complete based at least in part on determining the voltage level of the signal;

increment, in response to operating in the hibernate mode, the first input parameter;

transition from the hibernate mode to the active mode based at least in part on incrementing the first input parameter;

determine, at a second time based on the incremented first input parameter, the voltage level of the signal received by the memory system relative to the second input parameter; and transmit data to a host system based at least in part on writing the value to the register of the memory system, the data comprising an indication of the voltage level of the signal based on the incremented first input parameter and the second input parameter.

14. The non-transitory computer-readable medium of claim 13, wherein the instructions, when executed by the processor of the electronic device, further cause the electronic device to:

increment, while operating in the hibernate mode, the second input parameter;

transition from the hibernate mode to the active mode based at least in part on incrementing the second input parameter; and determine, at the first time, the voltage level of the signal received by the memory system relative to the incremented second input parameter, wherein the data transmitted to the host system comprises the indication of the voltage level of the signal based on the incremented second input parameter.

15. A method, comprising:

receiving a command at a memory system, the command comprising an indication to initiate a signal quality test;

determining, at a first time while operating in an active mode of the memory system and based on a first input parameter, a voltage level of a signal received by the memory system relative to a second input parameter based at least in part on receiving the command, the second input parameter comprising a reference voltage level;

transitioning from the active mode to a hibernate mode of the memory system based at least in part on determining the voltage level of the signal;

writing, while operating in the hibernate mode of the memory system, a value to a register of the memory system to indicate that the signal quality test is complete based at least in part on determining the voltage level of the signal;

incrementing, in response to operating in the hibernate mode, the first input parameter;

transitioning from the hibernate mode to the active mode based at least in part on incrementing the first input parameter;

determining, at a second time based on the incremented first input parameter, the voltage level of the signal received by the memory system relative to the second input parameter; and transmitting data to a host system based at least in part on writing the value to the register of the memory system, the data comprising an indication of the voltage level of the signal based on the incremented first input parameter and the second input parameter.

\* \* \* \* \*